Nov. 20, 1923.  
C. J. GARRIGAN  
OIL HEATER  
Filed May 22, 1922  
1,474,524
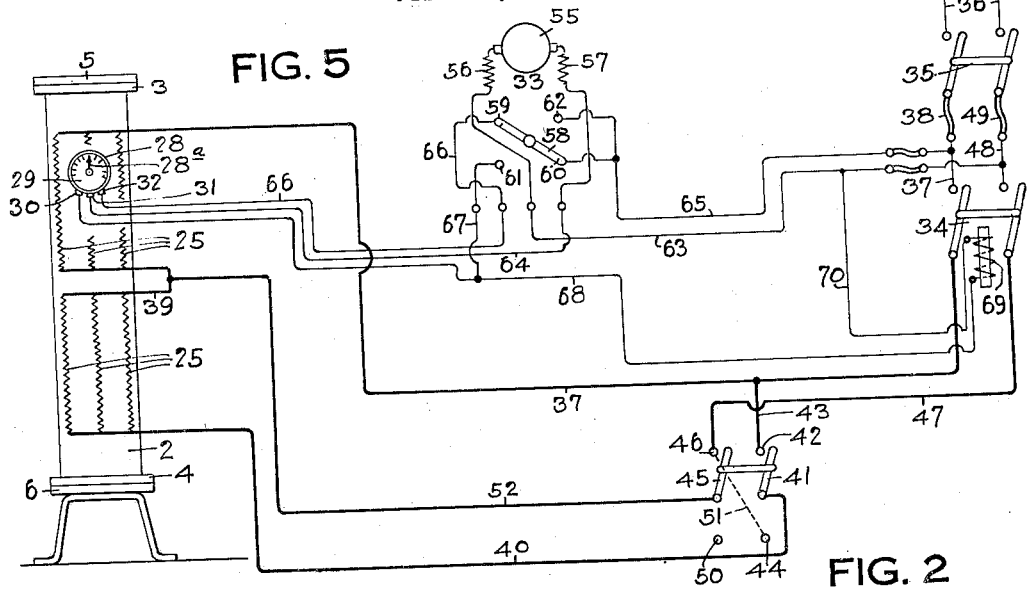
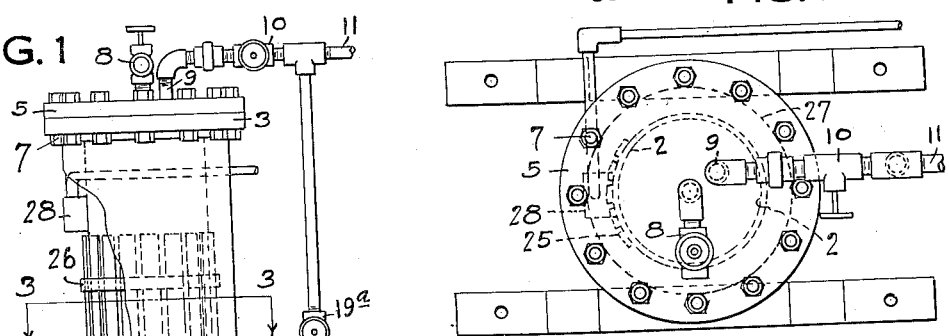
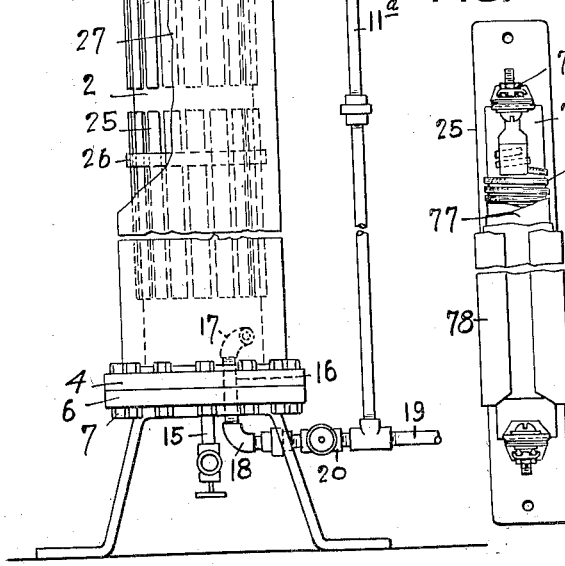
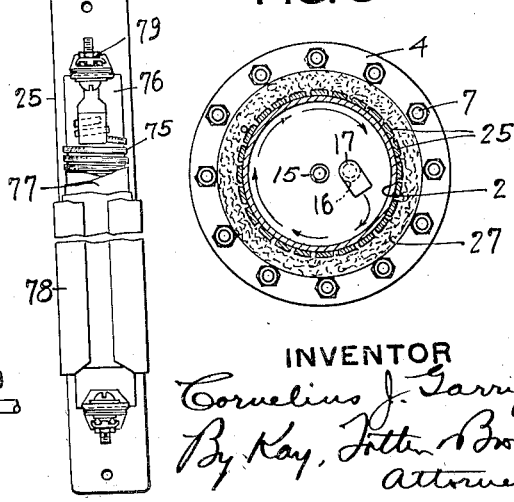
INVENTOR  
Cornelius J. Garrigan,  
By Kay, Totten & Brown,  
Attorneys Patented Nov. 20, 1923.

1,474,524

UNITED STATES PATENT OFFICE.

CORNELIUS J. GARRIGAN, OF MILLVALE, PENNSYLVANIA.

OIL HEATER.

Application filed May 22, 1922. Serial No. 562,695.

*To all whom it may concern:*

Be it known that I, CORNELIUS J. GARRIGAN, a citizen of the United States, and resident of Millvale, in the county of Allegheny and State of Pennsylvania, have invented a new and useful Improvement in Oil Heaters; and I do hereby declare the following to be a full, clear, and exact description thereof.

My invention relates to electric heaters for heating oil and other fluids, and is particularly, although not exclusively, designed for preheating fuel oil before the oil is supplied to burners.

The object of my invention is to provide an electric fluid heater of simple construction, wherein the oil or other fluid may be continuously passed through the heater and is there heated to a constant and regulable temperature.

In oil-heated open-hearth steel furnaces, and in other furnaces employing oil as the heating fuel, it is desirable that the oil be preheated before being supplied to the furnace burners and it is also desirable that the temperature to which the oil is preheated be maintained as nearly constant as possible, since changes in the temperature of the oil will produce fluctuations in the temperature of the furnace.

According to my present invention I provide an oil heater in which the oil is passed continuously through a hollow chamber heated by means of electric heating elements. The oil is introduced in such a way as to pass through the heating chamber with a swirling motion, so as to quickly bring all parts of the oil into contact with the heated walls of the chamber. The temperature to which the oil is heated is automatically maintained constant by means of a thermostat which controls the supply of current to the heaters. In the specific arrangement which I now employ for this purpose, the thermostat controls a motor-operated switch which, in turn, controls a contactor in the main supply line. I also provide means for connecting the electric heaters either in parallel or in series-parallel, so as to vary the heating effect for different seasons of the year or for different oils.

In the accompanying drawing, Fig. 1 is a side elevational view, with parts broken away, of an oil heater constructed in accordance with my invention; Fig. 2 is a top plan view of the heater shown in Fig. 1; Fig. 3 is a transverse sectional view taken substantially on the line 3—3, Fig. 1; Fig. 4 is a plan view, with parts broken away, of one of the electric space heaters; and Fig. 5 is a wiring diagram showing the electric circuit connections for the heaters.

In the drawing, the numeral 2 indicates the body of the heater, which may consist of a length of steel or copper pipe having upper and lower flanges 3 and 4, to which flange-unions 5 and 6 are connected by means of bolts 7. The dimensions of the parts are immaterial, but the body 2 may, for example, consist of a 5-foot length of 10-inch pipe.

The upper flange-union 5 is tapped to receive a relief valve 8 and a discharge pipe 9 which is connected through suitable pipe fittings and a valve 10 to a pipe 11 which conveys the heated oil to the furnace burners or other desired points of use.

The bottom flange-union 6 is tapped to receive a draw-off valve 15 and a service L composed of a straight length of pipe 16 carrying an elbow 17 at its upper end and having its lower end connected by means of an elbow 18 and suitable pipe-fittings to a supply pipe 19 leading from a suitable oil supply. The admission of oil is controlled by means of a valve 20.

The elbow 18 is so positioned with regard to the inner walls of the body 2 that the oil is caused to circulate against the sides of the wall with a swirling motion, as indicated by the arrows on Fig. 3.

Around the outside of the tubular body 2 are arranged two rows of space-heaters 25 which may be of standard commercial construction and are best shown in Fig. 4. These heaters are held in place upon the body 2 by means of steel bands 26; and are covered with heat-insulating boiler lagging 27. I prefer to employ one of the bands 26 for each set of heaters and to place these bands near the tops of the heater sections, in order to permit expansion and contraction of the heaters without causing them to buckle away from the body 2.

The pipes 11 and 19 are connected by means of a by-pass pipe 11ª controlled by a valve 19ª. By closing the valves 10 and 20 the heater may be cut out from the oil circuit, for replacing the space heaters or for any other purpose, and the oil may then be transferred from the supply pipe 19 to the feed pipe 11 through the by-pass pipe 11ª, the flow being regulated by the valve 19ª.

A thermostat 28 is secured to the tubular body 2 near the upper end thereof, and is of a standard construction in which the thermostat may be set at a desired temperature by turning the pointer 28 on a dial 29 and in which three contact members 30, 31 and 32 are arranged to be bridged by a thermostatic contact member, not shown. For example, the contact members 31 and 32 may be bridged by the thermostat when the temperature in the body 2 falls below the predetermined temperature at which the thermostat is set, and the contact members 30 and 31 may be arranged to be bridged by the thermostatic contact member when the temperature in the heater rises above the temperature at which the thermostat is set.

Fig. 5 shows a diagram of connections for supplying current to the space heaters 25 and for regulating the current through the action of the thermostat 28. These connections include a motor-operated switch indicated generally by the numeral 33; an electro-magnetic contactor 34, and a hand-switch 35 through which current is supplied from line-conductors 36. The main circuit for supplying current to the heaters 25 includes the line conductors 36, the switch 35, and a conductor 37 which leads through a fuse 38 and one arm of the contactor 34 to the upper ends of the upper row of heaters 25 which are connected in parallel. A conductor 39 connects the upper and lower space heaters in series-parallel relation, and a conductor 40 joins the lower end of the lower parallel combination of space heaters to one arm 41 of a series-parallel double-throw switch, the arm 41 being adapted, in one closed position, to engage a fixed contact member 42 joined by a conductor 43 to the conductor 37, while in its other closed position the arm 41 engages a fixed contact member 44. The other arm 45 of the double-throw switch is adapted in one closed position to engage a fixed contact member 46 which is connected by means of a conductor 47 to the other arm of the automatic contactor 34, and thence through a conductor 48 and a fuse 49 to the main switch 35. In its other closed position the arm 45 of the double-throw switch engages a fixed contact member 50 which, however, is not included in any of the circuit connections. The contacts 44 and 46 are connected by a conductor 51.

A conductor 52 connects the conductor 39 to the arm 45 of the double-throw switch.

It will be evident that the above connections permit the two sets of space heaters 25 to be connected either in series or in parallel with each other. When the parallel connection is desired the double-throw switch is closed upon the contacts 42 and 46, whereupon, when the main circuit is closed by the switch 35 and the contactor 34, current flows through the conductor 47, the switch arm 45 and conductor 52 to the conductor 39, thence in parallel through the upper and lower sets of space heaters and back to the line through the conductors 37 and 40, the conductor 40 being joined to the conductor 37 through the switch arm 41 and the conductor 43. When it is desired to operate the sets of space heaters in series the double-throw switch is closed in its opposite position where the arm 41 is closed upon the contact 44 and the arm 45 upon the open contact 50. Current then flows from the line through the conductors 48 and 51, switch arm 41, and conductor 40 to the lower set of heaters 25, thence through the conductor 39 to the upper set of heaters and back to the line from the upper end of the upper set through the conductor 37.

The motor-operated snap switch 33 may be of an ordinary standard type including a motor 55 having field windings 56 and 57, and having its armature shaft connected through the usual spring to a switch member 58 which in one position bridges two contacts 59 and 60, and in another position bridges contacts 61 and 62. The field winding 56 is connected to the line-conductor 48 by means of a conductor 63, while the field winding 57 is connected through a conductor 64 to the center contact 31 of the thermostat 29. A conductor 65 connects the line-conductor 37 to the contacts 60 and 62. The contact 59 is connected by a conductor 66 to the contact 32 of the thermostat 29, while the contact 61 is connected by a conductor 67 to a conductor 68 which connects the contact 30 of the thermostat 29 with one terminal of the magnet winding 69 of the contactor 34. The other terminal of the winding 69 is connected by means of a conductor 70 to the conductor 63.

With the switch member 58 in the position shown in Fig. 1, the thermostat 29 may be assumed to be set at a suitable temperature, for example, 200° F. No current flows through the winding 69 of the contactor 34 at this time, and the contactor is held open by the means of the usual spring, not shown, until the temperature within the heater falls below the predetermined temperature at which the thermostat is set. At this time the thermostatic member contained within the thermostat 29 bridges the contact members 31 and 32, whereupon current flows from the line through the conductor 65, contact 60, switch member 58, contact 59, conductor 66, contact 32, through the thermostatic member to the contact 31, thence through the conductor 64, field windings 57 and 56 and conductor 63 to the line conductor 48. The field windings of the motor being thus energized, the armature of the motor 55 is turned, thus winding up the spring through which connection is made in this type of switch with the switch member 58, and finally snapping the switch member 58 from the position shown on the drawing to the position where it engages the contacts 61 and 62. This interrupts the circuit through the motor and completes the circuit through the contactor 34, the current passing from the line conductor 37 through conductor 65, contact 62, switch member 58, contact 61, conductors 67 and 68 to the magnet coil 69, and thence through the conductors 70 and 63 back to the line conductor 48. The contactor 34 is closed through the energizing of the coil 69 and remains closed as long as current flows in the control circuit just outlined, thus permitting current to flow through the main circuit including the heaters 25.

When the temperature within the heater rises above the predetermined temperature at which the thermostat is set, its thermostatic contact member bridges the contact members 30 and 31, whereupon the field windings of the motor 55 are again energized by current flowing from the line conductor 37 through conductors 65, contact 62, switch member 58, contact 61, conductors 67 and 68, thermostatic contact 30, across through the thermostatic contact member to the contact 31, thence through the conductors 64, field windings 57 and 56 and conductor 63 back to the line conductor 48. This again sets the armature of the motor 55 in rotation, winding up the spring and again rotating the switch member 58 through another half revolution, bringing it again to the position shown on the drawing. This movement of the switch member 58 again breaks the circuit through the motor 55, and also interrupts the circuit through the coil 69, whereupon the contactor 34 automatically opens, thus interrupting the main circuit through the heaters 25. Through the circuit connections described above, the temperature to which the oil is heated is automatically kept constant.

The space heaters 25 are, as shown, of a well-known commercial form, consisting of a heating element 75 wound on a mica form 76 and inclosed and protected by a mica sheath 77 and a steel casing 78, suitable terminals 79 being provided for attaching the conductor wires. My invention is not limited to this particular form of heater but may employ electric heating units of any desired construction.

While I have shown and described the construction which I now prefer to employ, it will be understood that various changes may be made without departing from my invention as set forth in the appended claims.

I claim as my invention:

1. An electric fluid heater comprising an electrically heated and substantially unobstructed chamber, and means for causing fluid to flow with a swirling motion through said chamber.

2. An electric fluid heater comprising a tubular metal casing, electric heating elements disposed outside of and adjacent to said casing, an inlet pipe extending into the lower end of said casing and adapted to discharge fluid tangentially against the inner wall of said casing, and means for withdrawing fluid from the top of said casing.

3. An electric fluid heater comprising a tubular metal casing, metal-sheathed electric heating elements resting flat against the outside of said casing, heat-insulating material surrounding said heating elements, and means for passing fluid through said casing.

4. An electric fluid heater comprising a tubular metal casing, electric heating elements resting flat against the outside of said casing, heat-insulating material surrounding said heating elements, and means for passing fluid through said casing comprising an inlet pipe extending through one end of said casing and adapted to discharge fluid tangentially against the inner wall of said casing, and an outlet pipe communicating with the outer end of said casing.

5. An electric fluid heater comprising a tubular metal casing having its opposite ends provided with flanges, heads removably secured to said flanges, an inlet pipe extending through one of said heads and adapted to discharge fluid tangentially against the inner wall of said casing, and an outlet pipe extending through the head at the opposite end of said casing.

6. An electric fluid heater comprising a tubular metal casing having its opposite ends provided with flanges, heads removably secured to said flanges, an inlet pipe extending through one of said heads and adapted to discharge fluid tangentially against the inner wall of said casing, an outlet pipe extending through the head at the opposite end of said casing, a relief valve communicating with the interior of said casing, and a by-pass pipe connecting the said inlet and outlet pipes.

In testimony whereof I the said Cornelius J. Garrigan have hereunto set my hand.

CORNELIUS J. GARRIGAN.